United States Patent
Jedlicka

[11] Patent Number: 5,857,016
[45] Date of Patent: Jan. 5, 1999

[54] SYSTEM AND METHOD FOR AUTOMATICALLY DELIVERING AN INCOMING CALLING LINE IDENTIFICATION TO A PAGING SYSTEM

[75] Inventor: Timothy Edward Jedlicka, Glen Ellyn, Ill.

[73] Assignee: Lucent Technologies Inc., Murray Hill, N.J.

[21] Appl. No.: 719,293

[22] Filed: Sep. 17, 1996

[51] Int. Cl.$^6$ ............... H04B 1/56; H04B 3/42; H04B 1/00; H04B 11/00

[52] U.S. Cl. ............... 379/142; 379/210; 379/355; 455/417

[58] Field of Search ............... 379/140, 142, 379/354, 355, 373, 377, 210, 211, 212; 455/415, 417

[56] References Cited

U.S. PATENT DOCUMENTS

| | | | |
|---|---|---|---|
| 5,459,458 | 10/1995 | Richardson | 340/825.44 |
| 5,459,773 | 10/1995 | Hwang | 379/57 |
| 5,502,761 | 3/1996 | Duncan et al. | 379/142 |
| 5,627,875 | 5/1997 | Kapsales | 379/142 |
| 5,631,950 | 5/1997 | Brown | 379/142 |

*Primary Examiner*—Paul Loomis
*Attorney, Agent, or Firm*—Michael B. Johannesen; Neil R. Ormos

[57] ABSTRACT

A system for automatically providing an incoming calling line identification (ICLID) to a paging system, so that a called party knows who called (or, at a minimum that a call was received) when he/she is away from a telephone. By this method, the calling party does not have to know any other numbers besides the called party's base number, and does not have to know PIN or other identification systems for use with a paging system. An incoming calling line ICLID is received, and the call is completed either to an answering machine on the customer premise or, alternatively, to a voice mail system. The customer premise device waits until the line has cleared and then dials a telephone number of a paging service, optionally entering any PIN number or other code number and then outpulses the received ICLID to the paging service. The paging service then pages the called party, and causes the ICLID to be displayed.

21 Claims, 6 Drawing Sheets

SYSTEM AND METHOD FOR AUTOMATICALLY DELIVERING AN INCOMING CALLING LINE IDENTIFICATION TO A PAGING SYSTEM

TECHNICAL FIELD

This invention relates to the field of incoming calling line identification, and, more specifically, to the area of automatically providing an incoming calling line identification (ICLID) to a paging system, whereby the called party may know that he/she was called and know the calling party's number while the calling party only dials one telephone number.

BACKGROUND OF THE INVENTION

People are feeling an ever-increasing need to stay "in touch." Among these people are doctors, lawyers, real estate agents, etc. to whom time is money. Also, many of today's workers are perpetually "on call," requiring them to be available at any time.

In response to this need, telephone service providers have developed many different ways of trying to keep people "in touch." People may have a plurality of telephone devices (some wireline and some cellular), and these devices may be all contacted via a single telephone number (see, for example, Harlow, U.S. Pat. No. 5,206,901). Alternatively, many different combinations of voice mail and paging systems are available, wherein a user can dial one number and leave a voice mail message, and then the called party is paged. However, the called party must call the voice mail center, or alternatively an answering service, in order to retrieve messages to find out who is calling, and the calling party must either enter a telephone number or leave a number verbally.

In another form of paging, the calling party dials a paging service number, optionally enters a personal identification number (PIN) of the called party and then enters a number at which he/she may be reached. This number is displayed on an alpha-numeric display on the called party's paging unit. However, the calling party must know the pager number of the called party, the PIN if necessary, must know how to leave a number on that particular type of paging service and, of course, be dialing from a telephone capable of sending dial-tone multi-frequency (DTMF) signals. In addition, if the calling party chooses to take no action (i.e., does not leave a message or does not page the called party) the called party is not aware that someone tried to reach him/her. Therefore, a problem in the art is that there is no system or method for paging a called party and providing the called party with information about the calling party without several steps being required by the called and/or the calling party.

SUMMARY OF THE INVENTION

This problem is solved and a technical advance is achieved in the art by a system and method that automatically provides an incoming calling line identification (ICLID) to a paging system, so that a called party knows who called when he/she is away from a telephone. In this manner, called party may then decide to call either the voice mail, answering machine, or other device, or, alternatively, call the party back directly. By this method, the calling party does not have to know any other numbers besides the called party's base number, and does not have to know a PIN or other identification codes for use with a paging system.

This invention is embodied in a customer premise device wherein an incoming calling line ICLID is received, as is known in the art. This ICLID is stored and the call may be completed either to an answering machine on the customer premise or, alternatively, to a voice mail system. The customer premise device waits until the line has cleared and then dials a telephone number of a paging service, optionally entering any PIN number or other code number and then transmits the received ICLID to the paging service. The paging service then pages the called party, and causes the ICLID to be displayed.

In a second embodiment comprising an ISDN system, an ISDN telephone station set is connected to a personal computer or, alternatively, a telephone station is connected to an ISDN interface board in a personal computer. The ISDN alert message is received by the computer and the ICLID extracted from the message. The computer then causes a new call appearance to originate a call, dials the number of the called party's paging system, including any PIN numbers, and delivers the received ICLID. The called party is then paged.

In a further alternative embodiment, this invention may be implemented in the telephone network. When an incoming call is received, including the ICLID, a database lookup is performed to determine the terminating line ID record. This terminating line ID record may include an indication that an additional phone number (the number of a paging system) is to be dialed, and in response, the telephone number is transmitted as a new origination and the network outpulses the calling line identification to the paging system. The call may also be completed to the called telephone line, or, alternatively, to a voice message system. This embodiment may reside in a switching system or in a node on an advanced intelligent network.

In the above manner, the calling party is notified of the calling line identification of a calling party, regardless of the base telephone number and location of the telephone. The user can then make an informed decision as to whether or not to retrieve messages, call the person back directly or, alternatively, ignore the call.

BRIEF DESCRIPTION OF THE DRAWING

A more complete understanding of the invention may be obtained from consideration of the following description in conjunction with the drawings in which.

DETAILED DESCRIPTION

Figure 1:
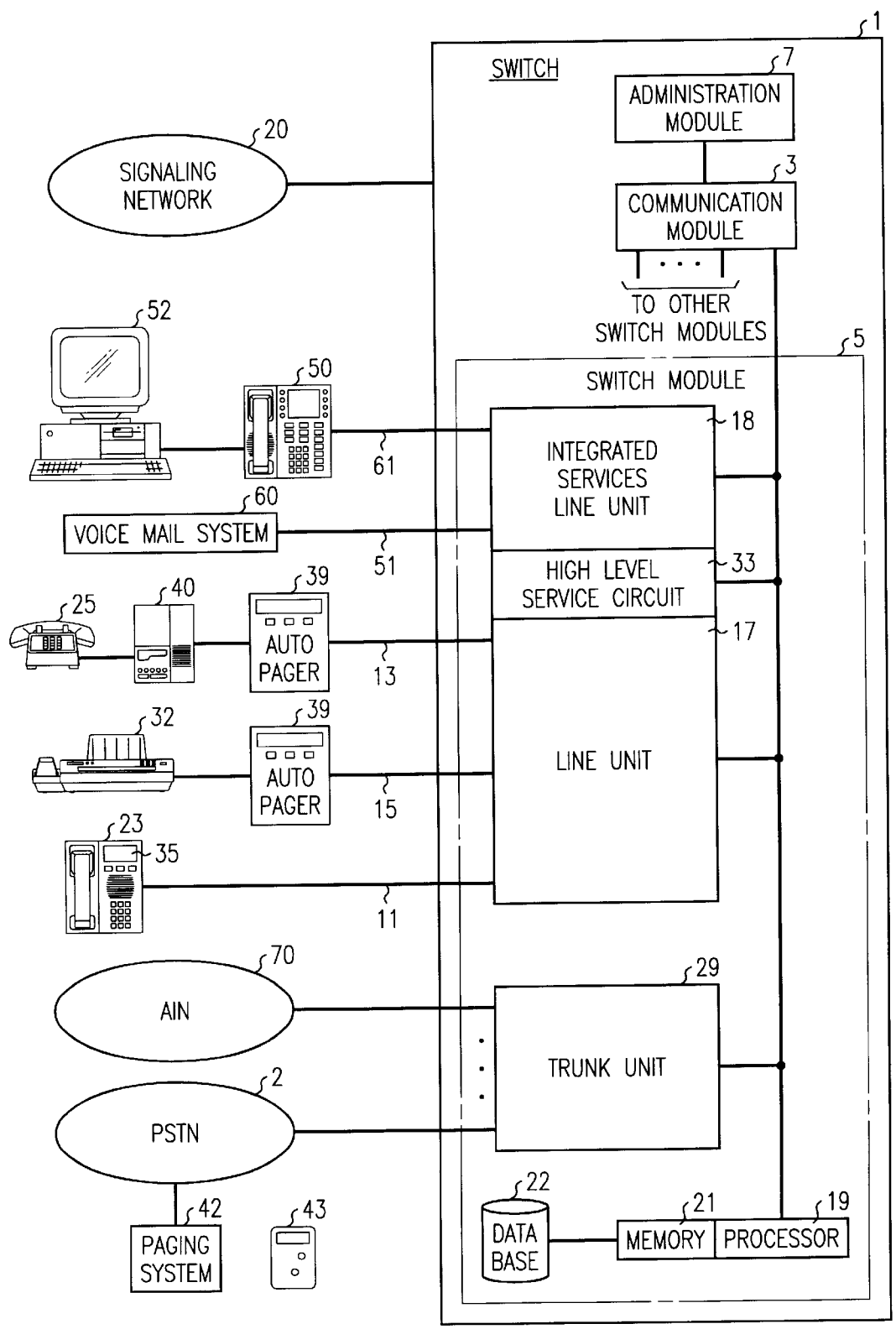
FIG. 1 is a block diagram of a telephone switching system supporting a plurality of analog and ISDN lines according to an exemplary embodiment of this invention.

An exemplary embodiment of a system that automatically delivers the incoming calling line ID from a base telephone to a paging system is described here in the context of a telephone network, as illustrated in FIG. 1, having a central office switch 1, which is connected to the public switched telephone network 2. Switch 1 is, illustratively, a distributed control, integrated services digital network (ISDN) electronic telephone switching system such as the system disclosed in U.S. Pat. No. 4,592,048, issued to M. W. Beckner, et al., on May 27, 1996. Alternatively, switch 1 may be a distributed control digital switch, such as a 5ESS® switch manufactured by Lucent Technologies, and described in the AT&T Technical Journal (vol. 64, number 6, July/August 1995, pages 1303–1564). Alternatively, switch 1 may be an analog electronic switching system such as a 1ESS™ or a 1AESS™ switch manufactured by Lucent Technologies, or a PBX, or any other type of switch without departing from the scope of this invention. The architecture of illustrated switch 1 includes communication module 3 as a hub with switching module 5 and other switching modules (not shown for clarity) and administrative module 7 eminating therefrom. Switching module 5 terminates analog and/or digital subscriber lines such as analog lines 11, 13, and 15, at analog line unit 17. Switching module 5 also terminates digital lines such as lines 51 and 61 at integrated services line unit 18. Switching module 5 also terminates analog or digital trunks through trunk units such as 29, which connects switch 1 to public switched telephone network 2.

Administrative module 7 provides coordination of the functional components of switch 1, human machine interface, and a connection to signaling network 20. Switching module 5 also includes processor 19 and memory 21. Processor 19 controls the functionality of switch module 5, and uses memory 21 to store the programs in data by which it operates, including database 22. Line units 17 and 18 provide the interface between telephones such as 23, 25, and 50, facsimile machine 32, and voice mail system 60, and the switching fabric (not shown) of switch module 5, in switch 1, as is known in the art. Line units 17 and 18 provide concentration, scanning, and other services, as are known in the art, and described in the above references, and will, therefore, not be described further. Line unit 17 also includes a high-level service circuit (HLSC) 33 for applying ringing and other services.

An exemplary embodiment of this invention is illustrated in the interaction between switch 1 and auto pager box 39, connected by line 13. Auto pager box 39 is connected between telephone 25 and line 13 to line unit 17 of switch module 5 of switch 1. Optionally, an answering machine 40 may be connected between telephone and auto pager box 39, which is similar in the art to current caller ID boxes. According to this invention, a call is set up to telephone 25 from switch module 5, through line unit 17. In this part of the call, processor 19 receives the incoming calling line identification (ICLID), or sometimes called caller ID, of the calling telephone either from signaling network 20 or from trunk unit 19. Processor 19 performs a database 22 search in memory 21 to translate the directory number into a line identification or a equipment number, so that processor 19 may cause line unit 17 to connect line 11 to the incoming call. Processor 19 then determines that line 11 is not busy and causes HLSC 33 to apply ringing to line 11. Next, HLSC 33 (or, alternatively, another service unit, such as a low current digital service unit within SM 5), generates a frequency shift-keyed (FSK) signal to encode the ICLID into an analog signal may be sent across line 11. This is according to standard caller ID practice, as described in Doughty, U.S. Pat. Nos. 4,551,581 and 4,582,956, which are assigned to the assignee of this invention and incorporated herein by reference.

Auto pager box 39, as will be described further in connection with FIG. 2, receives the FSK signal and demodulates it. A control unit in box 39 then causes the demodulated ICLID to be displayed. Telephone 25 rings and either the user will answer or answering machine 40 may pick up the call. Alternatively, if the subscriber of telephone 25 subscribes to voice mail, after a predetermined number of rings processor 19 causes a connection of the call to line 61 and to voice mail system 60 or recording of messages, as is known in the art. Voice mail systems such as 60 are, for example, an AUDIX® voice mail system manufactured by Lucent Technologies.

According to this invention, auto pager box 39 not only displays the ICLID, but also stores it. Pager box 39 waits until line 13 has cleared (hangup on either answering machine 40, telephone 25, or alternatively, no further ringing signals). Next, auto pager box 39 causes line 13 to go offhook and dials the predetermined telephone number of paging system 42. Such dialing of digits may include any personal identification or "PIN" numbers as required by the paging system.

When a connection is established with paging system 42, auto pager box 39 may optionally outpulse a string of digits to indicate an auto page, which will be described further below, and then outpulses the received ICLID. Auto pager box 39 then hangs up line 15 and resets for the next incoming call. Paging system 42 operates as in the prior art to cause a page to a specific predetermined pager unit 43 for the dialed telephone number (or the PIN number), and sends an encoded radio signal which causes a numeric display to be displayed on pager 43. Such paging systems are well known in the art and, thus, will not be described further.

Thus, according to this invention, the subscriber of telephone 25 knows that he or she has received a telephone call and has the ICLID of the calling party. The person then can either access his or her answering machine 40 or voice mail system 60 or, alternatively, call the party back directly, according to the number received. Advantageously, a special code can be added to the beginning or the end of the ICLID to indicated that the page is from the auto page box and not a direct page. Thus, an individual may stay in touch with just one phone number and know when he or she has been called anywhere within the paging area and further have information regarding the call.

A further use of this invention may be seen in connection with fax machine 32 connected to line unit 17 via line 15. When a call is delivered to fax machine 32, auto pager box 39 may be programmed to send a page to the user of fax machine 32, so that person knows that a fax has been received and who sent the fax.

Additionally, a cellular telephone user may give out his or her base (land line) telephone number and be paged anywhere in the service area when a call is received. In this manner, the user may determine whether to call the calling party without having to incur air time charges by answering every call. When the ICLID is not available (for example, caller ID is blocked by the calling party), the ICLID delivered may be programmed to be a special code. Alternatively, the user may program the system to not page at all.

A further embodiment of this invention is shown in FIG. 1, wherein telephone 23, connected to line unit 17 via line 11, includes a built-in auto pager. Auto pager displays the ICLID in display 35, and, as above, waits for the line to clear and then outpulses the DN of the paging system 42 and the stored ICLID to be displayed on pager unit 43.

In a further alternative embodiment, ISDN telephone 50 and a device (such as a personal computer or PC) computer 52 are connected via ISDN line 51 to an integrated services line unit 18. PC 52 is exemplary, as it could be a work station or a specially designed adjunct. Alternatively, an analog or digital telephone may be plugged into an ISDN card or device connected to a programmable computer. According to this invention, it does not matter whether PC 52 is connected to telephone 50 or vice versa, as is known in the art. Telephone 50 in this embodiment is an ISDN telephone which includes feature package. Feature package 3 (available from Lucent Technologies for Lucent ISDN telephones) delivers the data message stream (D channel) via an RS 232 interface to PC 52. When a call is delivered to ISDN telephone 50, an alert message including the ICLID is delivered both to telephone 50 and to PC 52. PC 52 extracts the ICLID and, as above, waits for the call to clear. Alternatively, PC 52 may select a different call appearance which automatically places the initial call on hold and causes the dialer to dial or deliver a message dialing paging system 42 when PC 52 receives the acknowledgement message, indicating that paging system 42 has answered. PC 52 sends the optional auto page code, plus incoming calling line ID. PC 52 then hangs up the line which optionally removes the auto hold.

In an additional alternative embodiment, switch 1 itself, or in conjunction with an adjunct (i.e., an advanced intelligent network system 70) may provide this feature. In this exemplary embodiment, when a call is received at switch 1, a determination is made if the called line receives special treatment. This determination may be made in switch 1 or may be made in an adjunct switch, as is known in the art. If the call does receive special treatment, then a call is initiated to a paging system, as described above. Alternatively, if the paging system is part of the advance intelligent network, then a message is sent to the paging system, including the ICLID, if available, and any optional codes. The call can then be completed to the telephone line or, optionally, to a voice mail system. Furthermore, the switch (or intelligent network) could first make a determination whether the telephone was answered before sending a page.

Figure 2:
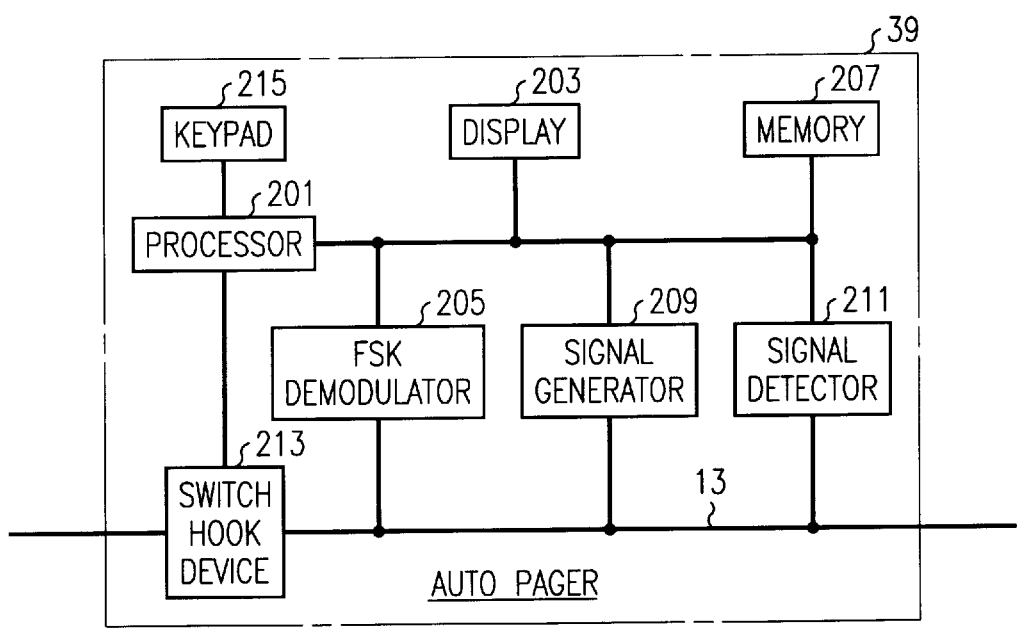
FIG. 2 is a functional block diagram of a customer premises device according to an exemplary embodiment of this invention.

Turning now to FIG. 2, an analog auto page box 39 is shown in block diagram showing the internal components. Auto page box 39 is connected via line 13 to switch 1 (FIG. 1) into telephone 25 (FIG. 1). Auto pager, box 39, includes processor 201, optional display 203, FSK demodulator 205, and memory 207, similar to an ICLID device. Thus, when an FSK signal arrives on line 13, it is demodulated in FSK demodulator 205 and delivered to processor 201 and memory 207. The signal is then displayed by processor 201 causing the demodulated telephone number to be displayed on display 203 and stored in memory 207. In accordance with this invention, auto pager box 39 further includes a dual-tone multi-frequency generator (DTMF) 209, a signal detector 211 and switch hook device 213. Thus, when the incoming calling line ID has been demodulated in FSK demodulator 205 and stored in memory 207, processor 201 can detect, via signal detector 211, when line 13 has cleared, i.e., hangup on line 13. Processor 201 can then cause an offhook on line 13 through switch hook device 213 and outpulses the preprogrammed telephone number of a paging system through DTMF generator 209. If there are signals expected from the paging system 42 (FIG. 1), then signal detector 211 can optionally detect such signals and then outpulse DTMF signals representing the stored ICLID through DTMF generator 209. A PIN and/or an auto page code may optional be sent out before or after the ICLID. If an acknowledgement signal is sent from paging system 42 and signal detector 211 may detect it and in form processor 201 and processor 201 causes an onhook at switch hook 213.

Figure 3:
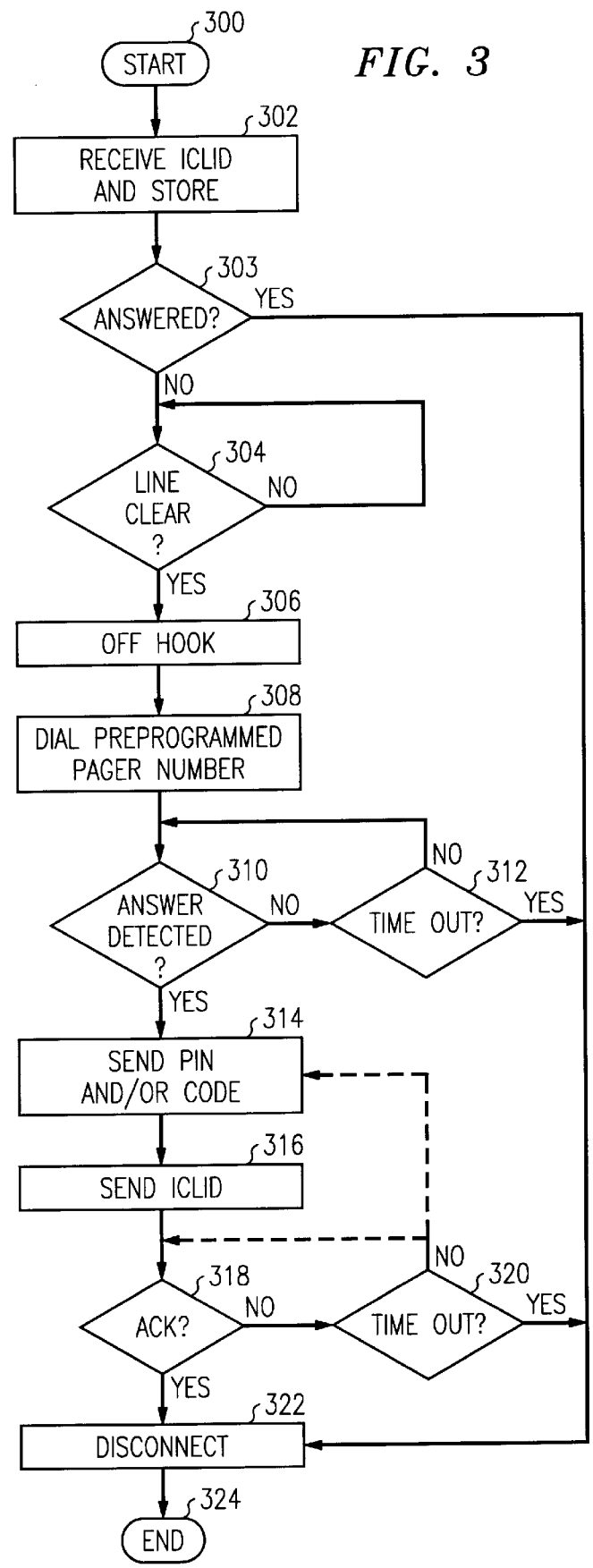
FIGS. 3–6 are flow charts describing the functionality of the embodiments of this invention.

Turning now to FIG. 3, a flow chart of the operation of the auto page box of FIG. 2 is shown. Processing starts in circle 300 and moves to box 302 where the ICLID is received and stored in memory. Processing proceeds to decision diamond 303, where a determination is made whether the phone has been answered. If so, a page is not sent, and processing ends. Otherwise, processing moves to decision diamond 304 where a determination is made whether the line is clear. This determination can be made by either a signal detector detecting a lack of ringing energy or lack of signals on line 13 or, alternatively, by switch hook device detecting a dial tone. If the line does not clear, processing remains at decision diamond 304.

Once the line is clear, processing continues to box 306 where the switch hook device 213 goes into an offhook condition. Processing continues to box 308, where processor 201 causes the directory number of the pager system to be dialed by causing signal generator 204 to outpulse preprogrammed DTMF signals onto line 13. In decision diamond 310, a determination is made if answer is detected from the paging system. Alternatively, a predetermined period of time may be programmed in order to represent the average amount of time for a connection to be made to the paging system. If answer is not detected in decision diamond 310, then a determination is made if there is a time out in decision diamond 312; that is, if too long a time period has passed between the time the call has been placed and the answer detection should have taken place. If there is a time out, then the processing moves down to disconnect 322. If decision diamond 312 has not timed out, processing returns to decision diamond 310.

If answer was detected in decision diamond 310 (or alternatively a predetermined amount of time has passed), processing proceeds to box 314 where a PIN and/or a code may optionally be sent. This code (such as "11" or some other easily identified digit string) is preprogrammed into memory 207 and represent an indication to the user that this call arrived at his or her home or base telephone. Processing continues to box 316 where the ICLID (received in box 302) is outpulsed using DTMF signals generated by signal generator 209. Processing continues to decision diamond 318 where processing waits for an acknowledgement. If no acknowledgement has been received, then a determination has been made if the program has timed out. If it has, then processing proceeds to disconnect. If the program has not timed out, then processing may return back to the send boxes or possibly to waiting for acknowledgement decision diamond 318.

Once an acknowledgement has been received, or, alternatively, directly after the ICLID has been sent, processing proceeds to disconnect 322, and switch hook 213 goes back onhook and processing ends at circle 324.

Figure 4:
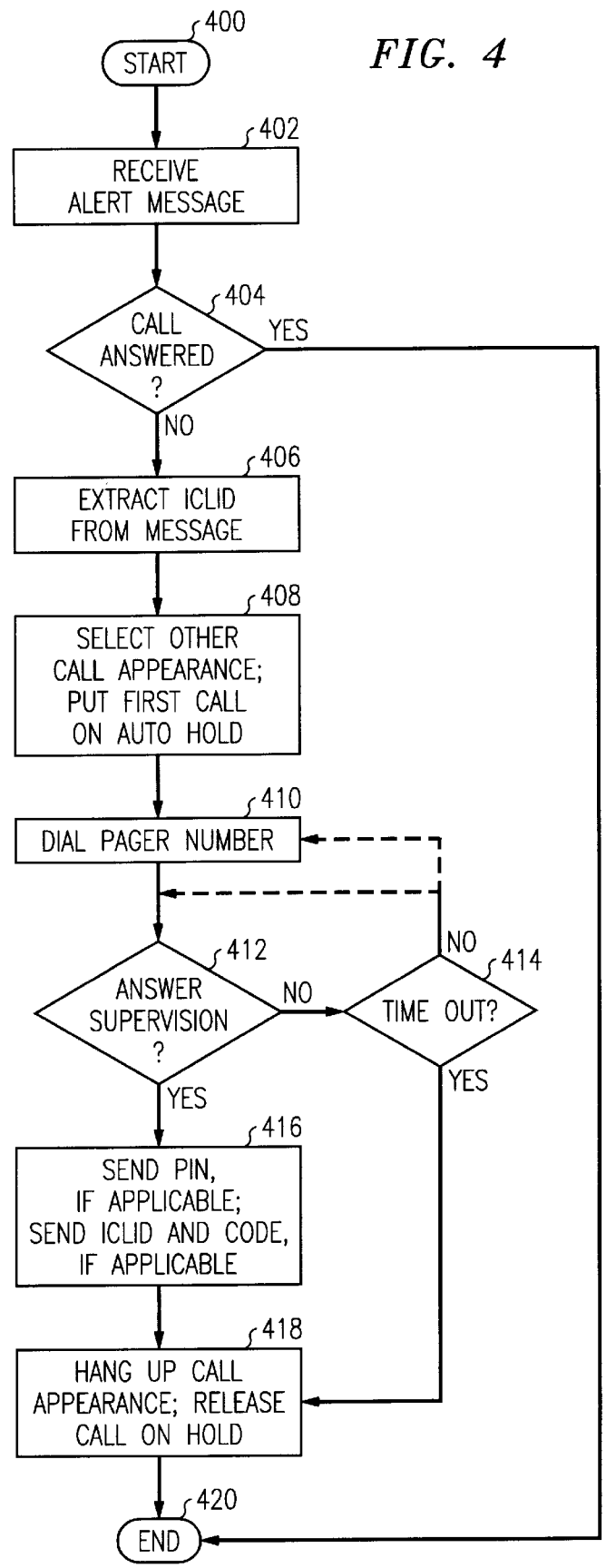

Turning now to FIG. 4, the processing according to an ISDN implementation of this invention is shown. Processing starts in circle 400 and moves to box 402 when an ISDN alert message is received from the switch. Processing optionally continues to decision diamond 404, where a determination is made if the call has been answered. If the call has been answered, then the user probably does not want to be paged and, therefore, processing moves to the end of circle 420.

If the call has not been answered within a predetermined period of time, processing continues to box 406 where the ICLID is extracted from the alert message. Processing continues to box 408 where another call appearance of the ISDN phone is selected and the first call appearance is put on automatic hold. Processing continues to box 410 where the pager number is dialed. Processing continues to decision diamond 412 where a determination is made if an acknowledgement has been received, indicating a completed call. If no acknowledgement has been received then processing continues to decision diamond 414 where determination is made if processing has timed out. If it has, then processing continues to box 418, where the paging call appearance is released. If the timer has not expired, then processing either returns back to dialed pager number 410 or waiting for acknowledgement 412, depending on the particular implementation.

When an acknowledgement is received in decision diamond 412, or after a brief delay, then processing continues to box 416, where any required PIN is sent, the ICLID is sent to the paging system using DTMF signaling, and any personal code that the user wishes sent with the ICLID, if applicable. Processing continues to box 418 where call appearance is hung up. Processing ends in circle 420.

Figure 5:
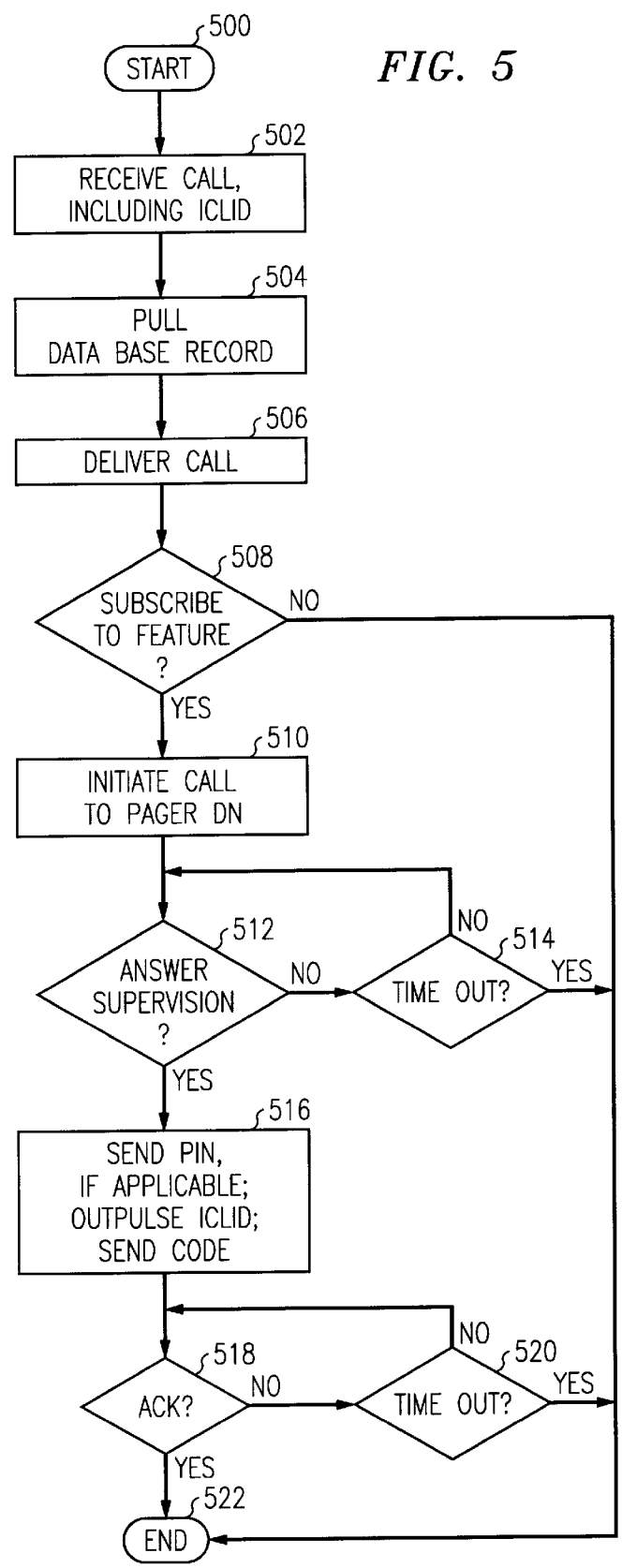

Turning now to FIG. 5, processing, according to an exemplary embodiment of this invention, implemented in switch 1 of FIG. 1 is shown. Processing (which may take place in the switching or in an adjunct, such as an advanced intelligent network) starts in circle 500 and moves to action box 502 where an incoming call is received. Such incoming call information usually includes the called directory number and ICLID information. Processing continues to box 504 where the switch pulls the data record for the called directory number. In box 506 the call is delivered to the line indicated in the data record. Processing continues to box 508 where a determination is made from the data record whether this particular subscriber subscribes to the auto paging feature. If the subscriber does not subscribe to the feature, then processing according to the invention ends at circle 522.

If the subscriber does subscribe to the feature, then in action box 510 the switch initiates a call to the pager directory number, which is stored in the database record. An optional determination is made in decision diamond 512 whether an acknowledgement is received from the pager system or from the switch connected to the pager system. If not, then a timer is set and a determination is made in box 514 whether there has been a timeout. If there has been, processing ends in circle 522. If not, the switch may reattempt to connect to the pager system or may wait longer for the acknowledgement.

Once an acknowledgement is received in box 512, or after a short pause, the ICLID received with the incoming call is outpulsed along with any code that the subscriber programmed in the feature in box 516. Optionally, processing could wait for acknowledgement in decision diamond 518 with an additional time out in decision diamond 520. Otherwise, processing ends in circle 522.

Figure 6:
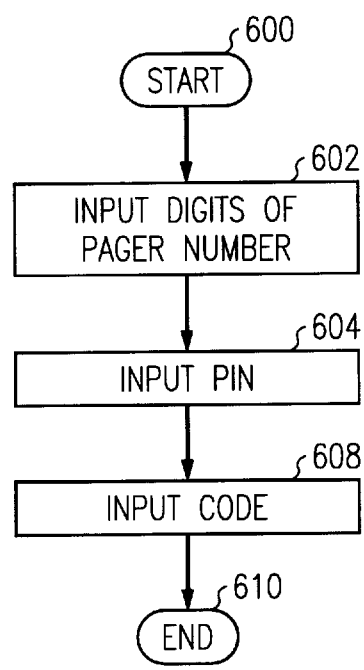

Turning now to FIG. 6, user programming of features for this invention is shown. The user needs to be able to program data such as the directory number of the paging service, a PIN number if needed, a code if desired. Therefore, an analog box such as auto pager box 39 includes a program button, which causes the processor to prompt the user for input of digits of pager number in box 602. The telephone's keypad may be used and digits recognized by the signal detector 211. The user may then be prompted by means of the display or a tone (such as DTMF) to input a PIN number in box 604. Finally, the user can be prompted to input a code if desired in box 608. Optionally, the user may enter pauses between numbers (such as a pager DN and a PIN) by use of the * or # key. Processing ends in circle 610.

It is to be understood that the above-described embodiments are merely illustrative principles of the invention, and that many variations may be devised by those skilled in the art without departing from the scope of the invention. It is, therefore, intended that such variations be included within the scope of the claims.

The invention claimed is:

1. A method for use in a telephone network, said method comprising:
   receiving from a telephone network an incoming calling line identification (ICLID) associated with a call placed by a caller;
   dialing without caller interaction a directory number of a paging system;
   transmitting said received ICLID to said paging system; and
   said paging system transmitting said ICLID to a paging device.

2. A method in accordance with claim 1 wherein a code is transmitted to said paging system with said a ICLID.

3. A method in accordance with claim 2 wherein said code is transmitted before said ICLID.

4. A method in accordance with claim 2 wherein said code is transmitted after said ICLID.

5. A method in accordance with claim 1 wherein, after dialing said directory number of said paging system, a personal identification code is transmitted.

6. A customer premises apparatus connected to an analog telephone line, said apparatus comprising:
   means for receiving from a telephone network and storing an incoming calling line identification (ICLID) associated with a call placed by a caller;
   means for dialing without caller interaction a directory number of a paging system; and
   means for causing said paging system to transmit said ICLID to a paging device.

7. An apparatus in accordance with claim 6 wherein said means for receiving and storing said ICLID comprises a frequency shift key decoder and a memory means.

8. An apparatus in accordance with claim 6 wherein said means for dialing comprises a dual-tone, multi-frequency (DTMF) generator.

9. An apparatus in accordance with claim 6 wherein said means for causing said apparatus to transmit comprises means for retrieving said ICLID from said means for receiving and storing said ICLID and sending said ICLID through a DTMF generator.

10. An apparatus in accordance with claim 6 further including means for detecting signaling on said telephone line to coordinate operation of said means for dialing and said means for causing transmission of said ICLID to said paging system.

11. An apparatus in accordance with claim 6 further including switch hook means for connecting said apparatus to said telephone line.

12. An apparatus in accordance with claim 6 wherein said apparatus is integrated into a telephone.

13. An apparatus in accordance with claim 6 wherein said apparatus is a separate unit from a telephone.

14. A customer premises apparatus connected to an integrated services, digital network (ISDN) line, said apparatus comprising:
   means for receiving from a telephone network and storing an alert message associated with a call placed by a caller;
   means for extracting and storing a incoming calling line identification (ICLID) from said alert message;
   means for setting up an outgoing call;
   means operative without caller interaction for dialing a directory number of a paging system; and means for causing said paging system to transmit said ICLID to a paging device.

15. An apparatus in accordance with claim 14 wherein said means for causing said apparatus to transmit comprises means for retrieving said ICLID from said means for receiving and storing said ICLID and sending said ICLID through a DTMF generator.

16. An apparatus in accordance with claim 14 further including means for detecting signaling on said telephone line to coordinate operation of said means for dialing and said means for causing transmission of said ICLID to said paging system.

17. A central office switching system apparatus connected to a telephone network, said apparatus comprising:

means for receiving an incoming call placed by a caller from said telephone network for a telephone;

means for receiving and storing a incoming calling line identification (ICLID) for said incoming call;

means for setting up a call to said telephone;

means operative without caller interaction for setting up an outgoing call to a paging system; and means for causing said paging system to transmit said ICLID to a paging device.

18. An apparatus in accordance with claim 17 wherein said means for causing said apparatus to transmit comprises means for retrieving said ICLID from said means for receiving and storing said ICLID and sending said ICLID through a DTMF generator.

19. An apparatus in accordance with claim 17 further including means for detecting signaling on said telephone line to coordinate operation of said means for dialing and said means for causing transmission of said ICLID to said paging system.

20. An apparatus in accordance with claim 17 wherein said means for receiving an incoming call comprises a switching system.

21. An apparatus in accordance with claim 17 wherein said means for receiving an incoming call comprises an adjunct to a switching system.

* * * * *